(12) United States Patent
Perry et al.

(10) Patent No.: US 6,299,545 B1
(45) Date of Patent: Oct. 9, 2001

(54) ROTATING SHAFT ASSEMBLY

(75) Inventors: Gregory George Perry, Milan; Mark Warner Semeyn, Jr., Ypsilanti, both of MI (US)

(73) Assignee: Visteon Global tech., Inc., Dearborn, MI (US)

( * ) Notice: Subject to any disclaimer, the term of this patent is extended or adjusted under 35 U.S.C. 154(b) by 0 days.

(21) Appl. No.: 09/303,763

(22) Filed: May 3, 1999

(51) Int. Cl.$^7$ ........................................... F16C 3/00
(52) U.S. Cl. ................. 464/182; 74/421 A; 74/DIG. 10; 403/359.6
(58) Field of Search ............................ 464/182; 264/274; 74/421 A, DIG. 10; 403/359.1, 359.6, 375; 185/40 R

(56) References Cited

U.S. PATENT DOCUMENTS

| | | |
|---|---|---|
| 1,202,383 * | 10/1916 | Hardman .......................... 264/274 X |
| 1,858,650 * | 5/1932 | Weida .............................. 264/274 X |
| 2,924,424 | 2/1960 | Tittering . |
| 3,396,554 * | 8/1968 | Westercamp ..................... 464/182 X |
| 3,924,596 | 12/1975 | Klemm . |
| 4,008,877 | 2/1977 | Yasuoka et al. . |
| 4,601,271 | 7/1986 | Ejiri et al. . |
| 4,827,884 | 5/1989 | Cook . |
| 4,832,637 * | 5/1989 | Goluba .......................... 403/359.1 X |
| 4,838,226 | 6/1989 | Matsuzawa et al. . |
| 4,848,505 | 7/1989 | Yoshizawa et al. . |
| 4,873,954 | 10/1989 | Codling . |
| 4,879,657 | 11/1989 | Tamura et al. . |
| 4,892,071 | 1/1990 | Asayama . |
| 4,947,815 | 8/1990 | Peter . |
| 4,961,355 | 10/1990 | Irino . |
| 4,986,238 | 1/1991 | Terazawa . |
| 4,991,552 | 2/1991 | Luft et al. . |
| 5,014,666 | 5/1991 | Westenberger . |
| 5,018,496 | 5/1991 | Buchl . |
| 5,038,733 | 8/1991 | Westenberger . |
| 5,078,110 | 1/1992 | Rodefeld . |
| 5,103,787 | 4/1992 | Bassler et al. . |
| 5,113,822 | 5/1992 | Asayama . |
| 5,148,790 | 9/1992 | Hickman et al. . |
| 5,161,508 | 11/1992 | Zentgraf et al. . |
| 5,168,852 | 12/1992 | Moriguchi . |
| 5,168,951 | 12/1992 | Sugiura et al. . |
| 5,259,349 | 11/1993 | Radinski . |
| 5,265,572 | 11/1993 | Kadomukai et al. . |
| 5,275,375 | 1/1994 | Semence . |

(List continued on next page.)

FOREIGN PATENT DOCUMENTS

| | | |
|---|---|---|
| 1-239-533 | 4/1967 | (DE) . |
| 41 41 104 | 6/1993 | (DE) . |
| 19627943 | 12/1997 | (DE) . |
| Pub 0 574 093 | 6/1991 | (EP) . |
| 2698945 | 6/1994 | (FR) . |
| 148363 * | 7/1920 | (GB) .............................. 403/359.6 |
| 1 246 467 | 9/1971 | (GB) . |
| 2217 389 | 10/1989 | (GB) . |
| 2 233 038 | 1/1991 | (GB) . |
| 55-63054 * | 7/1920 | (JP) .............................. 74/DIG. 10 |
| 1-24129 | 1/1989 | (JP) . |
| 2-70932 | 9/1990 | (JP) . |

OTHER PUBLICATIONS

Rosato et al, Injection Molding Handbook, 2nd ed. New York, Chapman & Hall, TP 1150.R67 1995c.2, pp. 284 & 285, 1995.*

*Primary Examiner*—Lynne H. Browne
*Assistant Examiner*—Greg Binda
(74) *Attorney, Agent, or Firm*—Visteon Global Tech. Inc.

(57) ABSTRACT

A shaft assembly and method of manufacture are provided. A molded member is attached to the shaft. An axially extending groove is provided in the shaft, the groove having a bottom and a pair of radially projecting sides. A member is molded onto the shaft. A portion of the member flows into the groove and engages the groove sides, thereby fixing the member to the shaft.

8 Claims, 3 Drawing Sheets

U.S. PATENT DOCUMENTS

| | | |
|---|---|---|
| 5,297,521 | 3/1994 | Sasaki . |
| 5,297,522 | 3/1994 | Buchl . |
| 5,325,832 | 7/1994 | Maute et al. . |
| 5,423,299 | 6/1995 | Kumagai . |
| 5,429,090 | 7/1995 | Kotchi et al. . |
| 5,492,097 | 2/1996 | Byram et al. . |
| 5,503,494 * | 4/1996 | Kamata et al. .................. 403/359.6 |
| 5,522,361 | 6/1996 | Pickman et al. . |
| 5,630,571 | 5/1997 | Kipp et al. . |
| 5,632,245 | 5/1997 | Ropertz . |
| 5,746,177 | 5/1998 | Criss et al. . |
| 5,752,484 | 5/1998 | Apel et al. . |
| 5,762,044 | 6/1998 | Hollister et al. . |
| 5,775,292 | 9/1998 | Igarashi . |
| 5,794,591 | 8/1998 | Kalebjian et al. . |
| 5,797,589 | 8/1998 | Kalebjian et al. . |
| 5,848,334 * | 12/1998 | Kamola ........................... 464/182 X |
| 6,070,852 * | 6/2000 | McDonnell et al. ............ 251/129.11 |

* cited by examiner

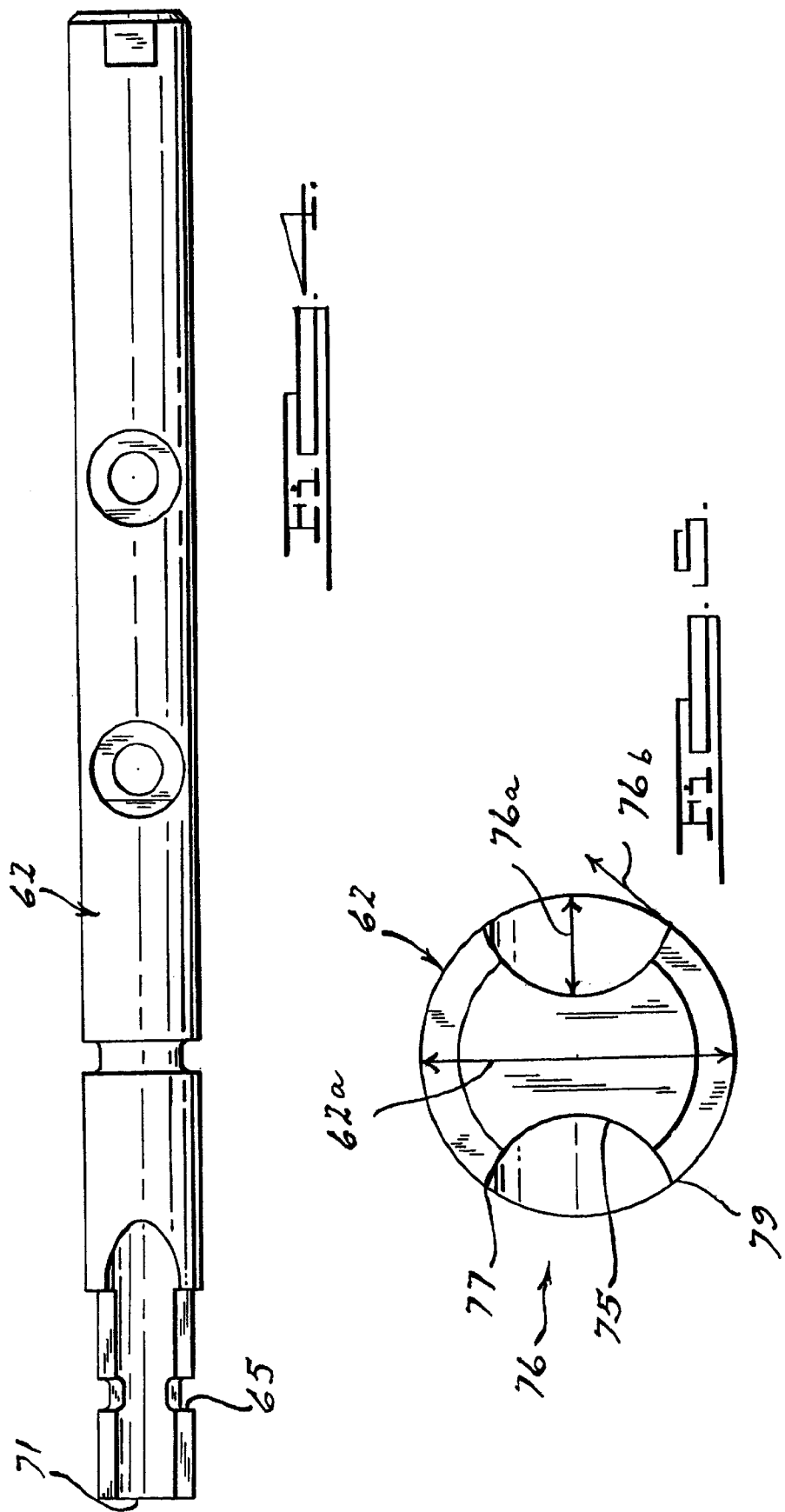

ROTATING SHAFT ASSEMBLY

CROSS-REFERENCE TO RELATED APPLICATIONS

The present application is related to the following patent applications which are co-owned by the same assignee: "Electronic Throttle Control With Default Mechanism Subassembly," Ser. No. 239,695 filed Jan. 29, 1999 now U.S. Pat. No. 6,070,852; "Throttle Body Shaft Axial Play Control," Ser. No. 240,762, filed Jan. 29, 1999; "Electronic Throttle Control With Adjustable Default Mechanism," Ser. No. 240,340, filed Jan. 29, 1999 now U.S. Pat. No. 6,095,488; and "Default Mechanism for Electronic Throttle Control System" Ser. No. 240,761, filed Jan. 29, 1999 now U.S. Pat. No. 6,155,533, which are incorporated herein by reference.

TECHNICAL FIELD

This invention relates to electronic valve control systems and more particularly to a method and apparatus for Securing a rotating member onto a shaft, particularly a gear onto a shaft for an electronic throttle control system for an internal combustion engine.

BACKGROUND

Valve assemblies for engines and related systems typically utilize rotatable valve members in fluid flow passageways to assist in regulating fluid flow through them. For example, throttle valve members are positioned in the air induction passageways into internal combustion engines. The valve assemblies are controlled either mechanically or electronically and utilize a mechanism which directly operates the valve member.

Known electronic throttle control assemblies utilize a plurality of components which typically are difficult and time consuming to assemble together. Also, the throttle or valve plate is positioned on a throttle body shaft which often experiences undesirable axial, rotary or radial movement which can adversely affect the operation of the valve assembly.

Prior systems, such as described in U.S. Pat. No. 5,746,177, and prior art FIG. 10 of U.S. Pat. No. 5,762,044 used a mechanical fastener to positively secure rotary members to the rotating shaft. These fasteners unnecessarily add cost and weight to the throttle assembly. Other designs, such as shown in FIG. 2 of U.S. Pat. No. 5,429,090, provided a shaft having a substantially rectangular shape at the end thereof. Similar concepts include a D-shape at the end of the shaft. However, these designs were found undesirable in a throttle body application because after several cycles, the material in the member attached to such a shaft became worn and the member became loose to the shaft and would move relative thereto.

U.S. Pat. No. 5,632,245 provides a complicated labyrinth within the end of the shaft into which material is molded to axially and rotationally fix the member. It is expensive and difficult to manufacture such a shaft and it is possible that the material will not flow into the labyrinth machined into the shaft.

It would be desirable to have an electronic valve control system which addressed the above concerns and provides an improved assembly and system, which also reduces costs and improves reliability.

SUMMARY OF THE INVENTION

Accordingly, the present invention provides an improved assembly and system, which reduces costs and improves reliability. A shaft includes a groove having a bottom and a pair of radial projections. A member is molded to the shaft to engage the groove. Thus, the member is fixed to the shaft against rotation.

Other features and advantages of the present invention will become apparent from the following description of the invention, particularly when viewed in accordance with the accompanying drawings and appended claims.

BRIEF DESCRIPTION OF THE DRAWINGS

FIG. 3 is a cross-sectional view of the electronic throttle control assembly of FIG. 1, the cross-section being taken along line 3—3 in FIG. 1 and in the direction of the arrows;

FIG. 4 illustrates a side view of a throttle body shaft according to the present invention; and FIG. 5 illustrates an end view of a throttle body shaft according to the present invention.

DESCRIPTION OF THE PREFERRED EMBODIMENT(s)

Figure 1:
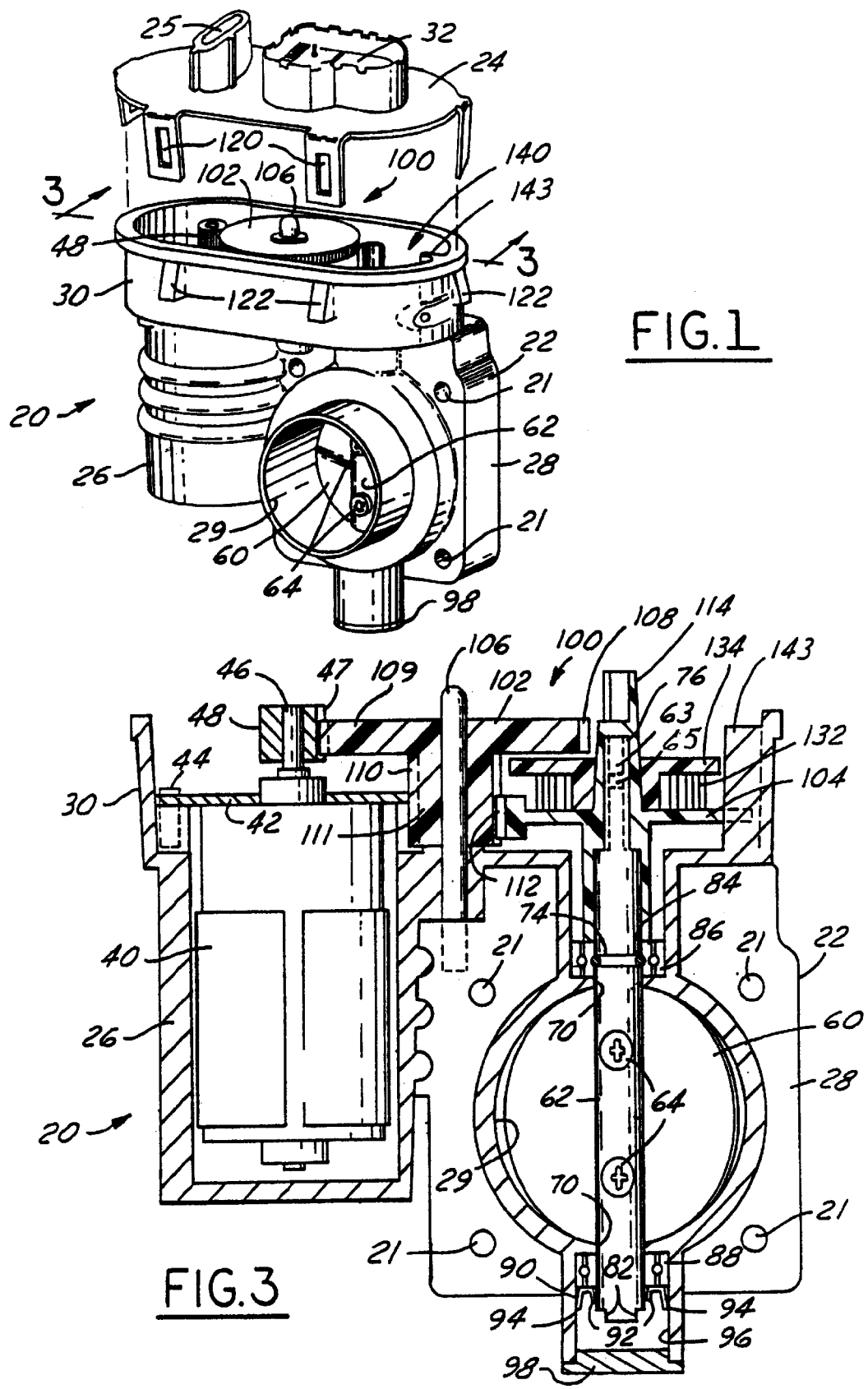
FIG. 1 illustrates an electronic throttle control assembly in accordance with the present invention.
Figure 2:
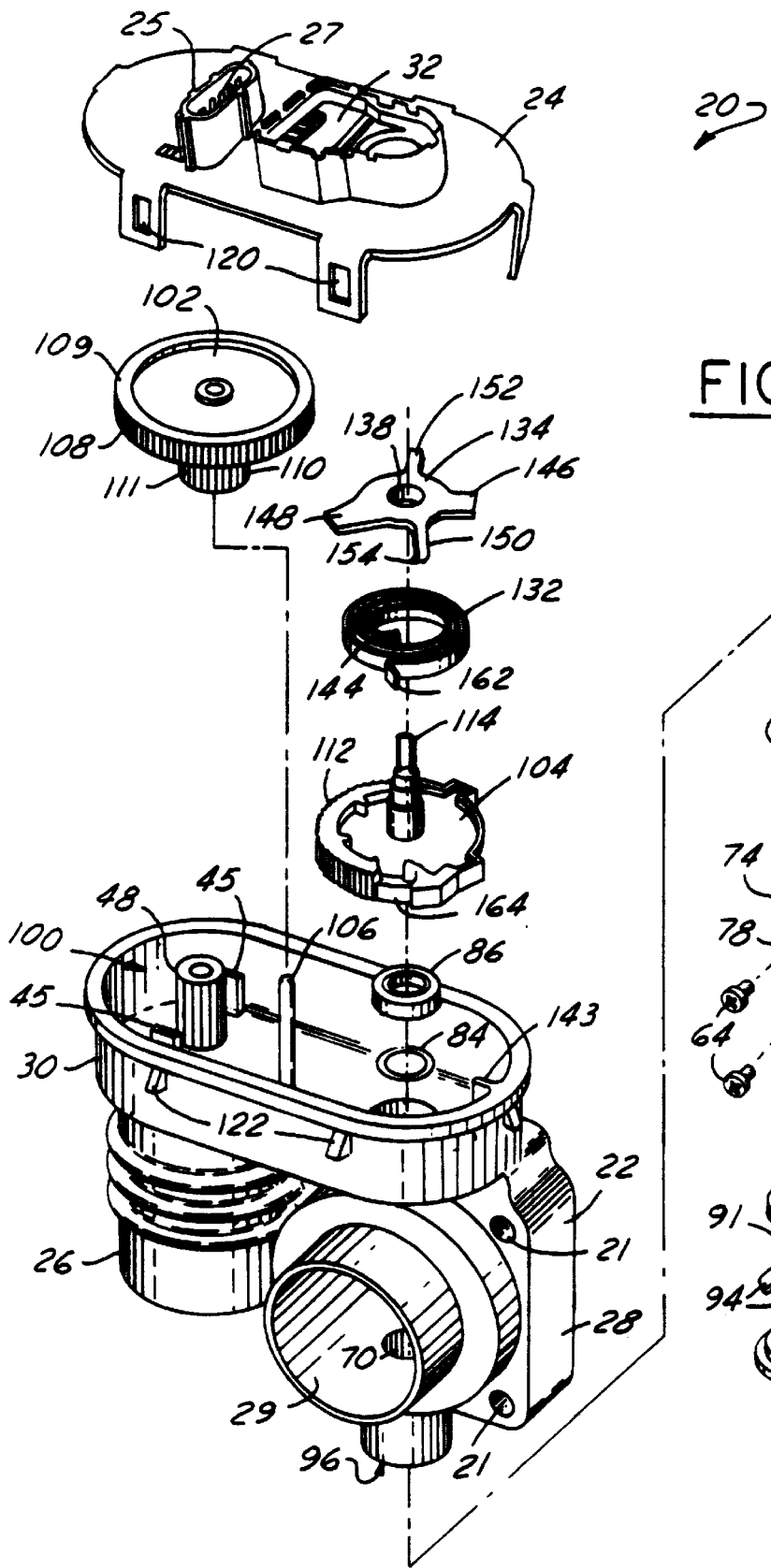
FIG. 2 is an exploded view of the electronic throttle control assembly of FIG. 1.

FIG. 1–3 illustrate one embodiment of an electronic throttle control assembly in accordance with the present invention. FIG. 1 illustrates the assembly 20 in its assembled form, FIG. 2 illustrates the components of the assembly in an exploded condition, and FIG. 3 is a cross-sectional view of the assembly 20 as shown in FIG. 1 (without the cover).

The electronic throttle control assembly 20 includes a housing or body member 22 and a cover member 24. The housing 22 includes a motor section 26, a throttle valve section 28, and a gear train section 30. The cover member 24 includes the throttle position sensor (TPS) 32, together with related electronics, which reads or "senses" the position of the throttle valve and transmits it to the electronic control unit (not shown) of the vehicle. In order to connect the ECU to the TPS, an electrical connector 25 is positioned at one end of the cover 24. The connector preferably has six contacts: two to the motor which regulates the position of the throttle valve; and four to the TPS and related electronics.

When the driver or operator of the vehicle presses the vehicle accelerator, the electronic control unit (ECU) sends a signal to the electronics in the electronic throttle control assembly 20 which operates the motor which in turn operates the gear train and adjusts the position of the throttle valve. The throttle valve is positioned in the main air passageway 72 from the air intake inside the engine compartment to the internal combustion engine. The throttle valve thus regulates the airflow to the internal combustion engine.

The precise position of the throttle valve in the airflow passageway is sensed by the TPS and relayed or fed back to the ECU in order to confirm or adjust the desired throttle valve setting.

The cover member can be attached to the body member 22 in any conventional manner, but preferably is connected by a snap tab mechanism or circumferentially provided screws. For this purpose, a series of openings 120 are provided in the cover member for mating with a series of tab members 122 on the outside of the gear section 30 of the housing 22. Also, an appropriate gasket or sealing member (not shown) is preferably positioned between the cover member and the housing in order to protect the gear train and TPS from dirt, moisture and other environmental conditions. When the electronic throttle control assembly 20 is utilized, it is positioned in the engine compartment of the vehicle and bolted or otherwise securely fastened to the vehicle. For this purpose, a plurality of holes 21 are provided in the housing.

The motor 40, as best shown in FIG. 3, is a thirteen volt DC motor. The motor 40 is connected to a mounting plate 42 which is bolted or otherwise securely fastened to the body member 22 by a plurality of bolts, screws, or other fasteners 44. The plate 42 also has a pair of contacts (not shown) which electrically connect the electronics in the cover member 24 to the motor 40.

The motor 40 has a shaft 46 on which a small spur gear 48 is positioned. The gear 48 has a plurality of teeth 47 which mesh with and rotate adjacent gears, as described below. The throttle plate 60 is secured to a throttle body shaft 62 which in turn is positioned in the throttle section 28 of the body member or housing 22. The throttle plate 60 is secured to the throttle body shaft 62 by a plurality of small fasteners or plate screws 64. The throttle shaft 62 is positioned in a bore or channel 70 in the throttle section of the body member 22. The bore 70 is transverse to the axis of the air flow passageway 72.

Throttle shaft 62 has an O-ring channel or groove 74, a pair of grooves 76 at the upper end for connection to one of the gears (as explained below), a pair of openings 78 for positioning of the plate screws therethrough, an axial or longitudinally extending slot 80 for positioning of the throttle plate 60 therein, and a pair of flats or recesses or grooves 82 at the lower end for use in assembling and positioning the throttle valise. The flats 82 are utilized to rotate the throttle shaft 62 during assembly of the throttle plate and also during orientation and setup of the throttle positioning sensor (TPS) mechanism.

An O-ring 84 is positioned in the channel 74 on the throttle shaft. The O-ring 84 provides a seal between the air in the air flow passageway and the gear train components and electronics in the cover.

As shown in FIG. 3, once the throttle body shaft 62 is positioned in the body member 22 with the throttle plate 60 secured to it, an axial spring clip member 90 is secured to the lower end of the shaft. The spring clip 90 is also shown in more detail in FIG. 2. The spring clip 90 is has a central annular disc 91, a plurality of inner spring tab members 92 and a plurality of outer spring tab members 94. The spring clip member 90 is preferably made of a spring steel material. The tab members 90 and 92 securely hold the axial spring clip member 90 in place on the throttle body shaft 62 and hold the throttle body shaft 62 securely in position in the throttle section 28 of the body or housing member 22.

In this regard when the assembly 22 is assembled, as shown in FIG. 3, the inner tab members 92 are wedged against the surface of the throttle shaft 62, while the clip member 90 bears against the inner race of bearing 88.

For assembly of the throttle body shaft and throttle plate in the assembly 20, the throttle body shaft 62 is first positioned in the bore 70 and rotated in order to allow the plate 60 to be positioned in slot 80. The throttle body shaft 62 is then turned approximately 90 degrees in order to allow the throttle plate screws 64 to be secured through the shaft and plate, thereby securely affixing the plate to the shaft.

When the throttle body shaft 62 is positioned in the housing 22, a pair of bearings 86 and 68 are provided to allow ate throttle body shaft to rotate freely in the housing. The bearings 86 and 88 are conventional ball-bearing members with pairs of races separated by small ball-bearings.

The axial spring clip member 90 eliminates axial or longitudinal movement (or "play") of the throttle body shaft 62 inside of the throttle section. The upper end of the throttle body shaft 62 is secured against axial movement by the lower end of the molded sector gear (as shown in FIGS. 3 and as described in more detail below), while the axial spring clip 92 securely and tightly affixes the lower end of the throttle body shaft against axial movement.

During assembly, the clip member 90 is pushed or forced onto the shaft 62 until it contacts the inner race of bearing 88. Preferably, the clip member 90 is installed with a predetermined load. The load pre-loads both of the bearings 86 and 88 and eliminates any possible axial movement of the shaft in the assembly 22. The pre-load on the bearings also eliminates any radial movement or "slop" between the inner and outer races of the bearings.

The elimination of the axial and radial movement of the throttle shaft in the assembly improves the quality of the feedback signal provided by the TPS to the ECU. The movement of the throttle body shaft and hence the throttle plate will be more accurately and precisely sensed and read by the TPS and thus more accurately and precisely relayed to the ECU. The pre-loading of the bearing members also eliminates the burnishing of the ball-bearing members in the bearings during normal vehicle operation.

Thereafter, once the spring clip member 90 is installed in position, an end cap member or plug member 98 is positioned on the end of the cavity 96. This protects the lower end of the shaft From moisture, dirt and other environmental conditions which might adversely affect the operation of the throttle valve.

The gear assembly or gear train used with the electronic control assembly 20 in accordance with the present invention is generally referred to by the numeral 100 in the drawings. The gear train mechanism 100 includes spur gear 48 attached to motor 40, an intermediate gear member 102, and a sector gear member 104. The intermediate gear 102 is mounted on a shaft member 106 which is secured to the housing or body member 22 (see FIG. 1–3). The intermediate gear 102 can freely rotate on shaft 106.

The intermediate gear 102 has a first series of gear teeth 108 on a first section 109 and a second series of gear teeth 110 on a second section 111. A boss 130 is used to actuate the default lever and is positioned on the first section 109. The gear teeth 108 on gear 102 are positioned to mesh with the gear teeth 47 on the motor driven gear 48, while the gear teeth 110 are positioned and adapted for mating with the gear teeth 112 on the sector gear 104. As shown in the drawings in my above-referenced copending applications, which are incorporated herein by reference, the teeth 112 on gear 104 are only provided on a portion or sector of the outside circumference of the gear member.

All of the gear members 48, 102 and 104 are preferably made of a plastic material, such as nylon, although they can be made of any other comparable material, or metal, which has equivalent durability and function.

The sector gear 104 is preferably molded onto the end 63 of the throttle body shaft 62. For this purpose, the grooves 76 are provided in the shaft 62 which allow the sector gear to be integrally molded to the shaft and be permanently affixed thereto. The lower end 105 of the sector gear is preferably formed such that it contacts bearing 86, thus helping to hold throttle body shaft in axial position.

Grooves 76 are illustrated as having a substantially semicircular shape. This illustrated shape is preferred for machining purposes, and provides the benefit of a large bearing surface when the shaft 62 is rotated. In an alternative design, the grooves 76 comprise a U-Shape, or substantially rectilinear U-Shape. The grooves 76 preferably do not penetrate the shaft 62, so as to simplify machining.

In a preferred embodiment, as illustrated in FIGS. 4 and 5, the grooves 76 include a bottom portion 75 and a radial projection 77, 79 circumferentially spaced therefrom. As shown in FIG. 5, the grooves 76 are formed in a preferred embodiment by milling a groove 76 on either side of the cylindrical shaft 62. Preferably the grooves 76 are formed to the end 71 of the shaft 62.

In a preferred embodiment, a milling cutter having a radius 76b of about 32 mm is used to form the concave groove 76 shown in FIG. 5, the shaft 62 having a diameter 62a of about 8.0 mm. The bottom portion 75 of the groove 76 has a depth 76a of about 2.2 mm measured from the outer surface of the shaft 62. One skilled in the art appreciates the grooves 76 may be formed by any other means, including forging, casting, powdered metallurgy, cold forming, grinding, extruding, or any other known means. Similarly, if the shaft were formed from a molded plastic material, the grooves 76 would be integrally molded therein. The dimensions mentioned above are application specific and one skilled in the art appreciates in a low torque application, a smaller shaft, a shallower groove, or a single groove (the opposite side of the shaft 62 being convex) may suffice. Conversely, in a higher torque application, a larger shaft, additional or deeper grooves may be desired.

In another preferred embodiment, the shaft 62 further comprises a second annular groove 65. When the sector gear member 104 is molded onto the shaft 62, plastic material flows into the second groove 65 to axially retain the sector gear member 104.

One skilled in the art appreciates the present invention is also useful for mating parts together having corresponding male shapes to engage the grooves formed in the shaft, versus the molding process described above. Preferably an interference fit is formed, so as to properly fix the parts. Preferably the gear 102 is made from a plastic material, but one skilled in the art appreciates that an aluminum or steel, or any other material gear may be used. Further, one skilled in the art appreciates the gear 102 could be one of many another members, examples or which include a clutch disc, a lever, or a plate to hold a sensor.

The sector gear 104 has a central portion or member 114 which extends above the gear train 100 and either communicates with or makes direct contact with the throttle position sensor (TPS) mechanism 32 in the cover member 24. In order for the TPS to read the position of the throttle valve plate 60, the TPS must be able to correctly sense or read the movement and rotation of the throttle body shaft 62. This is why the gear 104 must be precisely positioned to the shaft 62 in a preferred embodiment. In an alternate embodiment, the gear 104 may magnetically communicate with the sensor mechanism 32 in a known manner.

The present invention also has a fail-safe mechanism which allows the throttle valve plate to remain open in the event of a failure of the electronics system in the throttle control mechanism or in the entire vehicle. For a detailed description of the "fail-safe" mechanism of the present electronic throttle control assembly 20 refer to my copending applications. From this description, it is apparent that the connection between the shaft 62 and gear 104 transmits torque and engages a stop on the housing 30, and therefore a robust attachment as presented here is necessary.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope or the invention as defined by the appended claims.

What is claimed is:

1. A gear and shaft assembly for transmitting a torque, comprising:
    a shaft having a pair of axially extending grooves provided therein, the grooves having a bottom and a pair of radially projecting sides, and an annular groove;
    a gear which is molded onto the shaft, a portion of the gear fitting into the axially extending grooves and the annular groove, thereby fixedly and axially retaining the gear to the shaft.

2. An assembly according to claim 1, wherein said shaft further comprises a first end, said grooves extending to said first end of said shaft.

3. An assembly according to claim 2, wherein said pair of axially extending grooves are substantially diametrically opposed.

4. An assembly according to claim 3, wherein the shaft further comprises a diameter of about 8 mm and the grooves each have a depth of about 2.2 mm.

5. An assembly according to claim 4, wherein the grooves are formed by a cutter having a radius of about 3.2 mm.

6. An assembly according to claim 5, wherein the grooves are cut into the shaft by use of a milling cutter.

7. An assembly according to claim 3, wherein said gear is a first gear and said first gear engages a second gear provided on a motor to transmit torque to said shaft to rotate said shaft.

8. An assembly according to claim 7, further comprising said first gear communicating with a sensor to detect a rotational position of the shaft.

* * * * *